July 4, 1961  D. L. SMITH  2,990,789
SANITARY ICE CREAM DIPPER
Filed Sept. 25, 1958

INVENTOR.
DANIEL L. SMITH
BY *Harold B. Hood*
ATTORNEY

United States Patent Office 2,990,789
Patented July 4, 1961

2,990,789
SANITARY ICE CREAM DIPPER
Daniel L. Smith, P.O. Box 386, Fort Myers, Fla., assignor to Daniel L. Smith, Fort Myers, Fla., as trustee
Filed Sept. 25, 1958, Ser. No. 763,291
1 Claim. (Cl. 107—48)

The present invention relates to a dipper for ice cream or the like.

One type of widely used ice cream dipper comprises a handle-equipped hemispherical bowl having a semi-circular element pivotally mounted therein for movement adjacent the inside surface of the bowl for releasing the ice cream from the bowl. During the use of such a dipper, a certain amount of the material being dipped works its way into the mounting of the pivotal element and into other seams and crevices within the dipper where, because of the difficulty of removing it therefrom, it is allowed to remain spoiling and producing an ideal location for the growth of bacteria. In order to remedy such a situation, many States have laws and regulations requiring that the ice cream dippers of commercial establishments be kept in running water while not being used. Such a solution, however, has not been completely satisfactory.

Another type of widely used ice cream dipper has no movable parts, including merely a bowl having a handle attached thereto. The obvious defect of such a dipper is that ice cream dipped by the dipper freezes and/or clings to the bowl of the dipper and is difficult to detach therefrom when it is desired to deposit the ice cream dip in a cone, dish or the like.

It is therefore an object of the present invention to provide an improved dipper for ice cream or the like.

It is a further object of the present invention to provide a highly sanitary ice cream dipper.

Still another object of the present invention is to provide an ice cream dipper which may be easily and completely cleaned.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claim is not violated.

Figure 1:
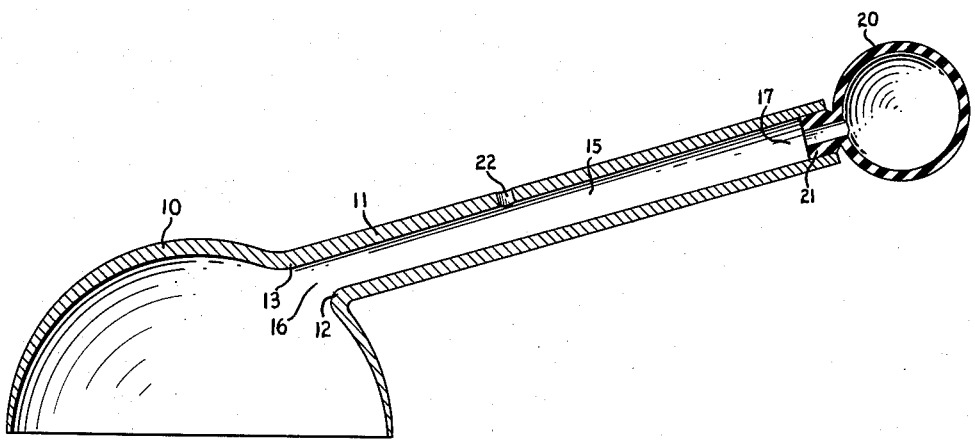
FIG. 1 is a section of an ice cream dipper constructed according to the principles of the present invention.

Referring now to the drawings, and specifically to FIG. 1, I have illustrated my dipper as comprising a hemispherical bowl 10 having an elongated member or handle 11 connected or attached thereto and extending from the external surface thereof. In manufacturing the dipper, the bowl 10 and handle 11 may be cast as one part and machined to a smooth finish or may be constructed in any other manner which will ensure that there will be no seams or open places in the areas indicated at 12 and 13 in FIG. 1 or in any other area of the dipper which could conceivably come into contact with the ice cream or other material being dipped.

The handle 11 is formed with a smooth straight hole or substantially cylindrical, hollow portion 15 extending therethrough, said hollow portion having one end 16 opening within the bowl 10, being of a substantially constant diameter completely along its length, and having its other end 17 opening outwardly of the handle 11. A resilient bulb 20 composed of rubber or similar resilient material has a thickened lip portion 21 which is snugly received within the outwardly opening end 17 of the hollow portion 15 in such a manner that it will normally be frictionally held within the hollow portion or may be easily removed therefrom if desired. The handle 11 is also provided with a vent 22 centrally thereof which extends from the hollow portion 15 and opens outwardly of the handle.

The dipper of FIG. 1 is used by grasping the handle and filling the bowl 10 with ice cream or the like in the conventional manner. The dipper is then held with the bowl over the location where it is desired to place the dip of ice cream. One of the operator's fingers is placed over the vent 22 and the bulb 20 is depressed or compressed by means of the little finger or possibly some other part of the operator's hand, causing air to be supplied under pressure from the bulb 20 into the hollow portion 15 of the handle 11 releasing the suction upon the dip of ice cream within the bowl 10 and providing positive air pressure ejecting the dip into the desired location.

Prior to releasing the compressing force upon the bulb 20, the operator should remove his finger from the vent 22, thus preventing ice cream from being sucked into the handle.

Although it is not so shown in the drawings, the bowl 10 may be recessed or counter-sunk in the area 13 or, alternatively, the diaper may be so constructed that the hollow portion 15 opens in the center of the interior of the bowl 10 so as to ensure an even distribution of the compressed air into the bowl.

Because of the straight, substantially constant diameter of the hollow portion 15, a brush may be easily inserted into that portion, after removing the bulb 20, for completely and thoroughly cleaning the hollow portion. It will be noted that all of the areas of the dipper which may become soiled from use, such as the interior of the bowl 10 and the end 16 of the hollow portion opening into the bowl 10, are easily accessible for brushing and cleaning. Before, after or alternately with such brushing, the hollow portion 15 may be aligned in registry with a conventional water spigot and a stream of water directed into the hollow portion for flushing out the dipper. It will be noted that there are no sharp turns, seams or crevices anywhere within the dipper at a location where ice cream will become deposited therein.

Figure 2:
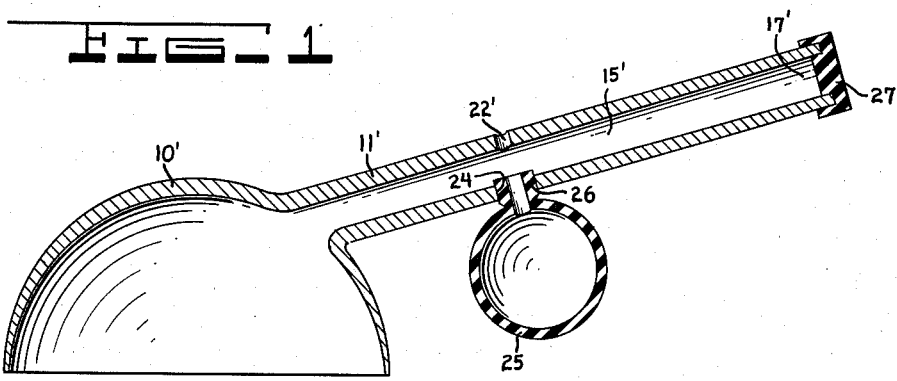
FIG. 2 is a similar section of an alternative embodiment of a dipper embodying the present invention.

Referring now to FIG. 2, a second embodiment of my invention comprises a bowl 10' having a handle 11' connected thereto in the manner above described, said handle having a vent 22' similar to the vent 22. The handle 11' has a cap 27 composed of rubber or similar material received thereon so as to close an end 17' of a straight-through, substantially constant diameter hollow portion 15' similar to the hollow portion 15. An aperture 24 in the side of the handle 11' extends from the hollow portion 15', opens outwardly of the handle 11' and has snugly received therein the thickened lip portion 26 of a resilient bulb 25 similar to the resilient bulb 20.

The dipper of FIG. 2 is operated in a similar fashion to that of FIG. 1 with probably the thumb being used to operate and depress the bulb 25 to cause ejection of the ice cream dip from the bowl 10'. The dipper of FIG. 2 may be easily cleaned in the manner above described by brushing and by flushing with water, after removal of the cap 27 and, if desired, after removal of the bulb 25.

Figure 3:
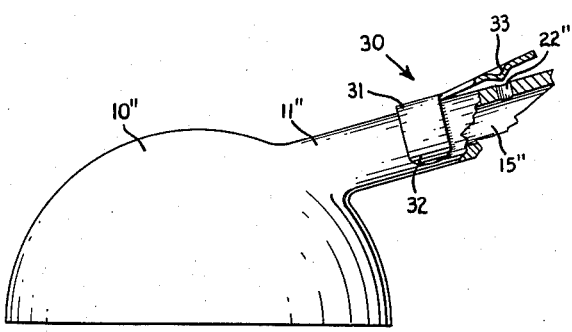
FIG. 3 is a fragmentary side view of still another embodiment of the present invention having certain portions thereof shown in section.

Referring now to FIG. 3, still another embodiment of my invention is disclosed which may be constructed in a manner similar to either the embodiment of FIG. 1 or the embodiment of FIG. 2 but which additionally includes a resilient closure element, indicated generally by the numeral 30. The resilient element 30 is formed, at one end 31, as a spring clip, that is, in a U-shape with the arms 32—32 (only one of which is shown) of the U-shaped end surrounding and detachably fixing the closure element 30 to the handle 11" of the dipper of FIG. 3 in such a manner that an indentation 33 of the closure element 30 is arranged directly above a vent 22" similar to the vents 22 and 22'. The resilient closure element 30 is used as an alternative to the finger used in the devices of FIGS. 1 and 2 to seal off the hollow portion 15" of the dipper of FIG. 3 in a very sanitary manner during compression of the resilient bulb of that dipper for ejecting the material contained within the bowl 10". The dipper of FIG. 3 may be cleaned in the manner above described, removing the closure element 30, if desired, for brushing and cleaning thereof and for cleaning the vent 22".

It should be noted that, instead of storing my dipper in running water resulting in water clinging to the dipper and being deposited in the ice cream container from which ice cream is being dipped causing freezing of the water in the container, I prefer to keep my dipper in an ultra-violet lighted cabinet, similar to those used by barbers for their tools, so as to insure that the dipper will be dry, clean and sanitary during use.

I claim as my invention:

A dipper comprising a hemispherical bowl, an elongated handle integral with said bowl and extending from the external surface of said bowl, said handle having a smooth, substantially cylindrical hollow portion extending longitudinally therethrough, said hollow portion opening at one end axially directly to the interior of said bowl, a detachable cap received upon the distal end of said handle and providing a substantially air-tight closure for the other end of said hollow portion, said handle being provided, between said cap and said bowl, with a vent extending transaxially from said hollow portion and opening externally of said handle, an aperture in said handle extending transaxially from said hollow portion and opening outwardly of said handle, and a resilient bulb having a hollow stem snugly received within said aperture in open communication with said hollow portion for supplying air under pressure to said hollow portion for causing material contained within said bowl to be ejected therefrom, said bulb being otherwise imperforate.

References Cited in the file of this patent

UNITED STATES PATENTS

| | | |
|---|---|---|
| 578,889 | Meincke | Mar. 16, 1897 |
| 1,255,906 | Miller | Feb. 12, 1918 |
| 1,698,716 | Cox | Jan. 15, 1929 |
| 1,834,012 | Willoughby | Dec. 1, 1931 |
| 2,108,233 | Pudlich | Feb. 15, 1938 |
| 2,260,689 | Miller | Oct. 28, 1941 |